(12) United States Patent
Retersdorf

(10) Patent No.: US 12,269,602 B2
(45) Date of Patent: Apr. 8, 2025

(54) AIR CYCLE MACHINES, AIR CYCLE MACHINE SYSTEMS, AND METHODS OF CONTROLLING AIR FLOW IN AIR CYCLE MACHINES

(71) Applicant: Hamilton Sundstrand Corporation, Charlotte, NC (US)

(72) Inventor: Alan Retersdorf, Avon, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 319 days.

(21) Appl. No.: 16/720,859

(22) Filed: Dec. 19, 2019

(65) Prior Publication Data

US 2021/0188449 A1 Jun. 24, 2021

(51) Int. Cl.
*B64D 13/08* (2006.01)
*B64D 13/02* (2006.01)
(Continued)

(52) U.S. Cl.
CPC .............. *B64D 13/08* (2013.01); *F25B 9/004* (2013.01); *B64D 13/02* (2013.01); *B64D 2013/0618* (2013.01); *B64D 2013/0648* (2013.01); *B64D 2013/0662* (2013.01); *B64D 2013/0688* (2013.01); *F02C 6/08* (2013.01); *F05B 2220/50* (2013.01)

(58) Field of Classification Search
CPC ............................... B64D 13/08; B64D 13/02; B64D 2013/0618; B64D 2013/0648; B64D 2013/0662; B64D 2013/0688; F25B 9/004; F25B 11/02; F02C 6/08; F05B 2220/50
See application file for complete search history.

(56) References Cited

U.S. PATENT DOCUMENTS 6,381,969 B1 * 5/2002 Afeiche ................ B64D 13/06
62/87
7,334,423 B2 2/2008 Bruno et al.
(Continued)

FOREIGN PATENT DOCUMENTS

EP 1220777 B1 7/2003
GB 768975 A * 2/1957

OTHER PUBLICATIONS

European Search Report for Application No. 20215807.7, mailed May 10, 2021, 8 pages.

*Primary Examiner* — Tavia Sullens
(74) *Attorney, Agent, or Firm* — CANTOR COLBURN LLP

(57) ABSTRACT

An air cycle machine includes a compressor in fluid communication with an output conduit, a first turbine operably connected to the compressor and fluidly coupling the compressor with the output conduit, a second turbine operably connected to the compressor and fluidly coupling the compressor with the output conduit, and a valve. The valve couples the compressor with the output conduit and has an open position and a closed position. In the open position the first turbine and the second turbine are fluidly connected in parallel between the compressor and the output conduit. In the closed position the first turbine is fluidly connected in series with the second turbine between the compressor and the output conduit. Air cycle machine systems and methods of controlling flow in air cycle machines are also described.

11 Claims, 5 Drawing Sheets

(51) Int. Cl.
    *B64D 13/06*     (2006.01)
    *F02C 6/08*     (2006.01)
    *F25B 9/00*     (2006.01)

(56) References Cited

U.S. PATENT DOCUMENTS

| | | | |
|---|---|---|---|
| 9,555,893 B2 * | 1/2017 | Squier | B64D 13/08 |
| 9,656,755 B2 | 5/2017 | Durbin et al. | |
| 10,408,501 B2 | 9/2019 | Elsherbini et al. | |
| 2004/0195447 A1 | 10/2004 | Claeys | |
| 2006/0059942 A1 | 3/2006 | McAuliffe et al. | |
| 2006/0196216 A1 | 9/2006 | Bruno et al. | |
| 2015/0166187 A1 * | 6/2015 | Durbin | B64D 13/08 62/79 |

\* cited by examiner

AIR CYCLE MACHINES, AIR CYCLE MACHINE SYSTEMS, AND METHODS OF CONTROLLING AIR FLOW IN AIR CYCLE MACHINES

BACKGROUND

The present disclosure relates generally to air cycle machines, and more particularly to controlling air flow through air cycle machines with flexible turbine arrangements.

Air cycle machines, such as air conditioning packs carried by aircraft, are commonly employed to provide conditioned air to environmentally controlled spaces. Such air cycle machines generally employ a centrifugal compressor, two air-to-air heat exchangers and an expansion turbine. Compressed air is communicated to the compressor, further compressed, cooled and thereafter expanded in the expansion turbine. As the air traverses the expansion turbine the air cools to a temperature suitable for mixing with ambient air for introduction into the environmentally controlled spaces. The power for such air cycle machines is generally provided by the differential between pressure of the compressed air provided to the compressor and that output pressure of the air cycle machines.

In some air cycle machines performance of the air cycle machine can be influenced by changes in the air cycle machine operating conditions. For example, decrease in pressure of the air input to the compressor can reduce the size of the cooling load that the air cycle machine is capable to carry. And while air cycle machines for a given application are generally selected to operate with acceptable performance at a particular design and/or sizing within a relatively large envelope, performance can drop off as conditions approach the extremes of the operating conditions envelope.

Such systems and methods have generally been acceptable for their intended purpose. However, there remains a need in the art for improved air cycle machines, air cycle machine systems, and methods of controlling flow through air cycle machines.

BRIEF DESCRIPTION

An air cycle machine is provided. The air cycle machine includes a compressor in fluid communication with an output conduit, a first turbine operably connected to the compressor and fluidly coupling the compressor with the output conduit, a second turbine operably connected to the compressor and fluidly coupling the compressor with the output conduit, and a valve. The valve couples the compressor with the output conduit and has an open position and a closed position. In the open position the first turbine and the second turbine are fluidly connected in parallel between the compressor and the output conduit. In the closed position the first turbine is fluidly connected in series with the second turbine between the compressor and the output conduit.

In addition to one or more of the features described above, or as an alternative, further embodiments of the air cycle machine may include that the valve is coupled to the output conduit by the first turbine.

In addition to one or more of the features described above, or as an alternative, further embodiments of the air cycle machine may include that the compressor is coupled by the second turbine to the output conduit.

In addition to one or more of the features described above, or as an alternative, further embodiments of the air cycle machine may include a check valve coupling the first turbine to the second turbine.

In addition to one or more of the features described above, or as an alternative, further embodiments of the air cycle machine may include a compressed air source in fluid communication with the first turbine through the compressor.

In addition to one or more of the features described above, or as an alternative, further embodiments of the air cycle machine may include a cabin or an overboard duct in fluid communication with the output conduit.

In addition to one or more of the features described above, or as an alternative, further embodiments of the air cycle machine may include a first turbine compressor drive shaft operably connecting the first turbine to the compressor and a second turbine compressor drive shaft operably connecting the second turbine to the compressor.

In addition to one or more of the features described above, or as an alternative, further embodiments of the air cycle machine may include that the valve is a first valve and that the air cycle machine also includes a second valve, the first valve connecting the first valve to the output conduit and the second valve connecting the compressor to the second turbine.

In addition to one or more of the features described above, or as an alternative, further embodiments of the air cycle machine may include a first load cooling heat exchanger fluidly coupling the first turbine to the first valve and a second load cooling heat exchanger fluidly coupling the second turbine to the output conduit.

In addition to one or more of the features described above, or as an alternative, further embodiments of the air cycle machine may include a secondary heat exchanger fluidly coupling the compressor to both the second valve and to the first valve through the first turbine.

In addition to one or more of the features described above, or as an alternative, further embodiments of the air cycle machine may include a primary heat exchanger in fluidly coupled to the compressor and in fluid communication therethrough with the first turbine and the second valve.

In addition to one or more of the features described above, or as an alternative, further embodiments of the air cycle machine may include a bypass conduit coupling the first turbine with the second turbine and a manifold fluidly coupling the compressor with the first turbine and the second turbine, the first valve connecting the manifold to the output conduit and the second valve connecting the compressor to the second turbine.

In addition to one or more of the features described above, or as an alternative, further embodiments of the air cycle machine may include a controller operably connected to the valve and having a memory with instructions recorded thereon that cause the controller to receive a bleed air pressure measurement, open the valve when the bleed air pressure measurement is below a predetermined bleed air pressure value, and close the valve when the bleed air pressure measurement is above the predetermined bleed air pressure value.

An air cycle machine system is also described. The air cycle machine system includes an air cycle machine as described above, the valve being a first valve and the air cycle machine system including a second valve connecting the compressor to the second, a compressed air source in fluid communication with the first turbine through the compressor, and a cabin or overboard duct in fluid communication with the output conduit.

In addition to one or more of the features described above, or as an alternative, further embodiments of the air cycle machine system may include that the output conduit is coupled to the first turbine by the first valve, wherein the compressor is coupled to the output conduit by the second turbine, and further comprising a check valve coupling the first turbine to the second turbine.

In addition to one or more of the features described above, or as an alternative, further embodiments of the air cycle machine system may include a controller operably connected to the first valve and the second valve, the controller including a memory having instructions recorded thereon that cause the controller to receive a bleed air pressure measurement, open the first valve when the bleed air pressure measurement is below a predetermined bleed air pressure value by moving the first valve to a first valve open position, open the second valve when the bleed air pressure measurement is below the predetermined bleed air pressure value by moving the second valve to a second valve open position, close the first valve when the bleed air pressure measurement is above the predetermined bleed air pressure value by moving the first valve to a first valve closed position, and close the second valve when the bleed air pressure measurement is above the predetermined bleed air pressure value by moving the second valve to a second valve closed position.

In addition to one or more of the features described above, or as an alternative, further embodiments of the air cycle machine system may include that the instructions cause the controller to move the first valve to the first valve closed position and the second valve to the second valve closed position coincidently with one another.

In addition to one or more of the features described above, or as an alternative, further embodiments of the air cycle machine system may include that the instructions cause the controller to move the first valve to the first valve open position and the second valve to the second valve open position coincidently with one another.

A method of controlling flow through an air cycle machine is additionally described. The method includes, at an air cycle machine as described above, fluidly coupling the first turbine and the second turbine in parallel with one another between the compressor and the output conduit by moving the valve to the open position, and fluidly coupling the first turbine to the second turbine between the compressor and the output conduit by moving the valve to the closed position.

In addition to one or more of the features described above, or as an alternative, further embodiments of the method may include receiving a bleed air pressure measurement, comparing the bleed air pressure measurement to a predetermined bleed pressure measurement, opening the valve when the bleed air pressure measurement is below a predetermined bleed air pressure value, and closing the valve when the bleed air pressure measurement is above the predetermined bleed air pressure value.

Technical effects of the present disclosure include the capability to change the flow path of air within an air cycle machine. In certain examples the present disclosure provides the capability to connect turbines of air cycle machines in series with one another when pressure of air provided to the air cycle machine is relatively high, and to further connect turbines of the air cycle machine in parallel with one another when pressure of air provided to the air cycle machine is relatively low. In accordance with certain examples air cycle machines are provided with relatively low hydraulic resistance over a relatively wide range of input pressures by changing connectivity of the air cycle machine turbines between serial and parallel arrangements according to pressure of air input to the air cycle machine.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
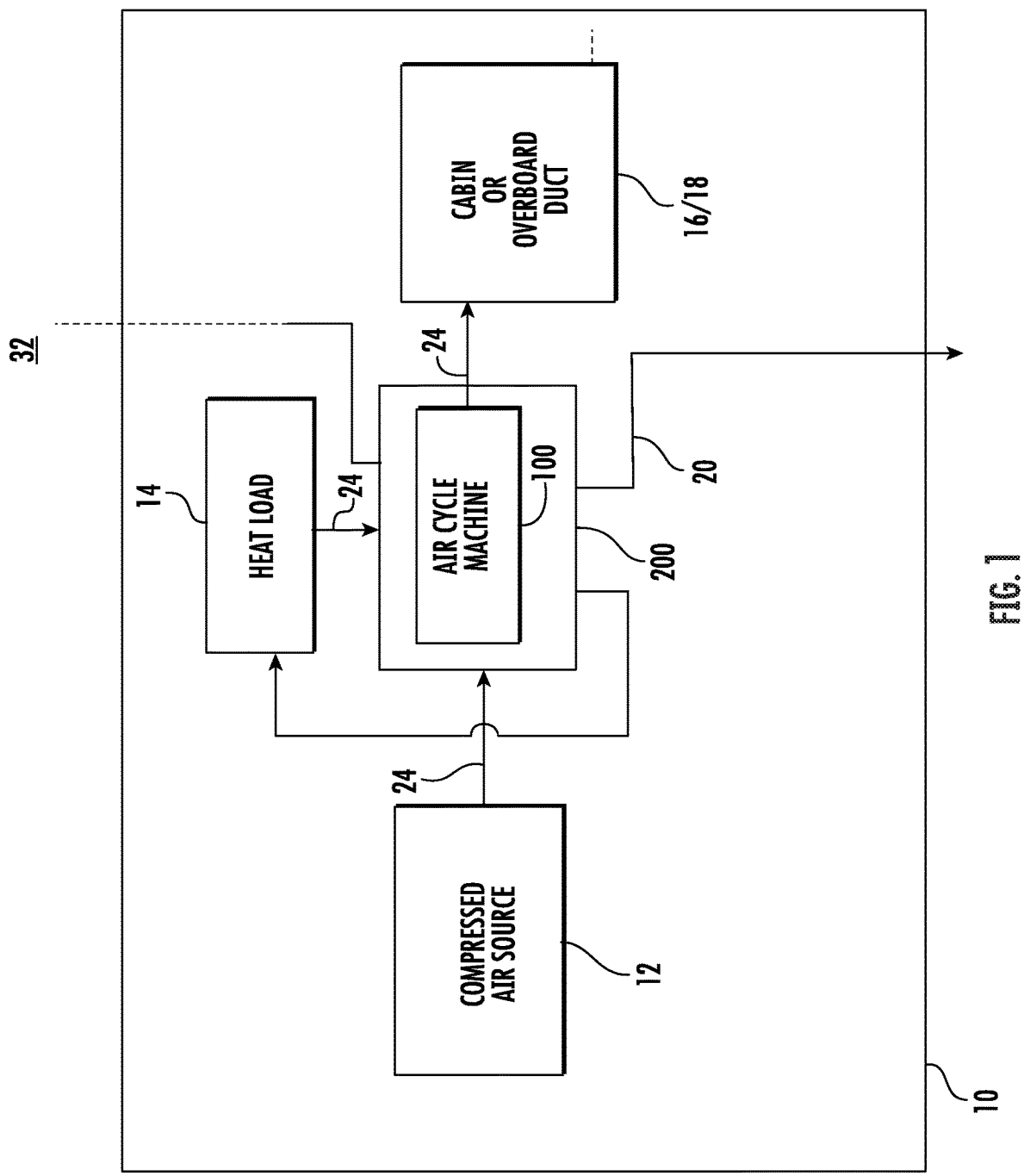
FIG. 1 is a schematic view of an air cycle machine constructed in accordance with the present disclosure, showing an air cycle machine having a low input pressure mode of operation and a high input pressure mode of operation.

Reference will now be made to the drawings wherein like reference numerals identify similar structural features or aspects of the subject disclosure. For purposes of explanation and illustration, and not limitation, a partial view of an example of an air cycle machine constructed in accordance with the disclosure is shown in FIG. 1 and is designated generally by reference character 100. Other embodiments of air cycle machines, air cycle machine systems, and methods of controlling flow within air cycle machines, are provided in FIGS. 2-5, as will be described. The systems and methods described herein can be used to provide conditioned air to environmentally controlled spaces on vehicles, such as crew and passenger spaces on aircraft, though the present disclosure is not limited to any particular type of environmentally controlled space or to aircraft in general.

Referring to FIG. 1, a vehicle 10, e.g., an aircraft, is shown. The vehicle 10 includes an air cycle machine system 200 including the air cycle machine 100, a compressed air source 12, and a heat load 14. The vehicle 10 also includes a cabin 16, an overboard air duct 18, and a fan or ram air duct 20.

The compressed air source 12 is configured to generate a compressed air flow 24 and is fluidly coupled to the air cycle machine 100. In certain examples the compressed air source 12 is a compressor section of a gas turbine engine and the compressed air flow 24 is a bleed air flow. In accordance with certain examples the compressed air source 12 can be a main engine or an auxiliary power unit carried by an aircraft. It is also contemplated that the compressed air source can be ground cart.

The heat load 14 is configured to generate heat 22 and is in thermal communication with the air cycle machine 100. It is contemplated that the heat load 14 communicate a portion of the heat 22 to the compressed air flow 24 as the compressed air flow traverses the air cycle machine 100. In certain examples the heat load includes an electrical device, such as a motor or an electronics cabinet by way of non-limiting example.

The cabin 16 is in fluid communication with the compressed air source 12 through the air cycle machine 100, is configured to receive the compressed air flow 24 from the air cycle machine 100 as a conditioned compressed air flow 24, and in certain examples fluidly couples the air cycle machine 100 to the overboard air duct 18. It is contemplated that, in certain examples, the cabin 16 can be a crew cabin located within an aircraft. For example, in certain examples, the cabin 16 is a passenger cabin located within an aircraft. It is also contemplated that cabin 16 can be cargo space located within an aircraft.

The fan or ram air duct 20 is configured to communicate an ambient air flow 28 to the air cycle machine 100 for removing heat from the air cycle machine 100. In this respect the fan or ram air duct 20 fluidly couples the external environment 32 to the air cycle machine 100.

As will be appreciated by those of skill in the art, air cycle machines are generally sized to provide suitable performance throughout a range of operating conditions. For example, air cycle machines are typically sized to provide sufficient conditioned air flow within a range of compressed air pressures and mass flow rates. Air cycle machines are also generally sized to provide sufficient conditioned air flow over a range of heat load and/or ambient air flows. As will also be appreciated by those of skill in the art, the size of the operating condition range within which the air cycle machine provides acceptable performance can be limited by the arrangement of the air cycle machine, e.g., by the amount of hydraulic resistance provided by the air cycle machine. To increase the range of operating conditions over which the conditioned air flow 26 can be provided to the cabin 16 the air cycle machine 100 is provided.

Figure 2:
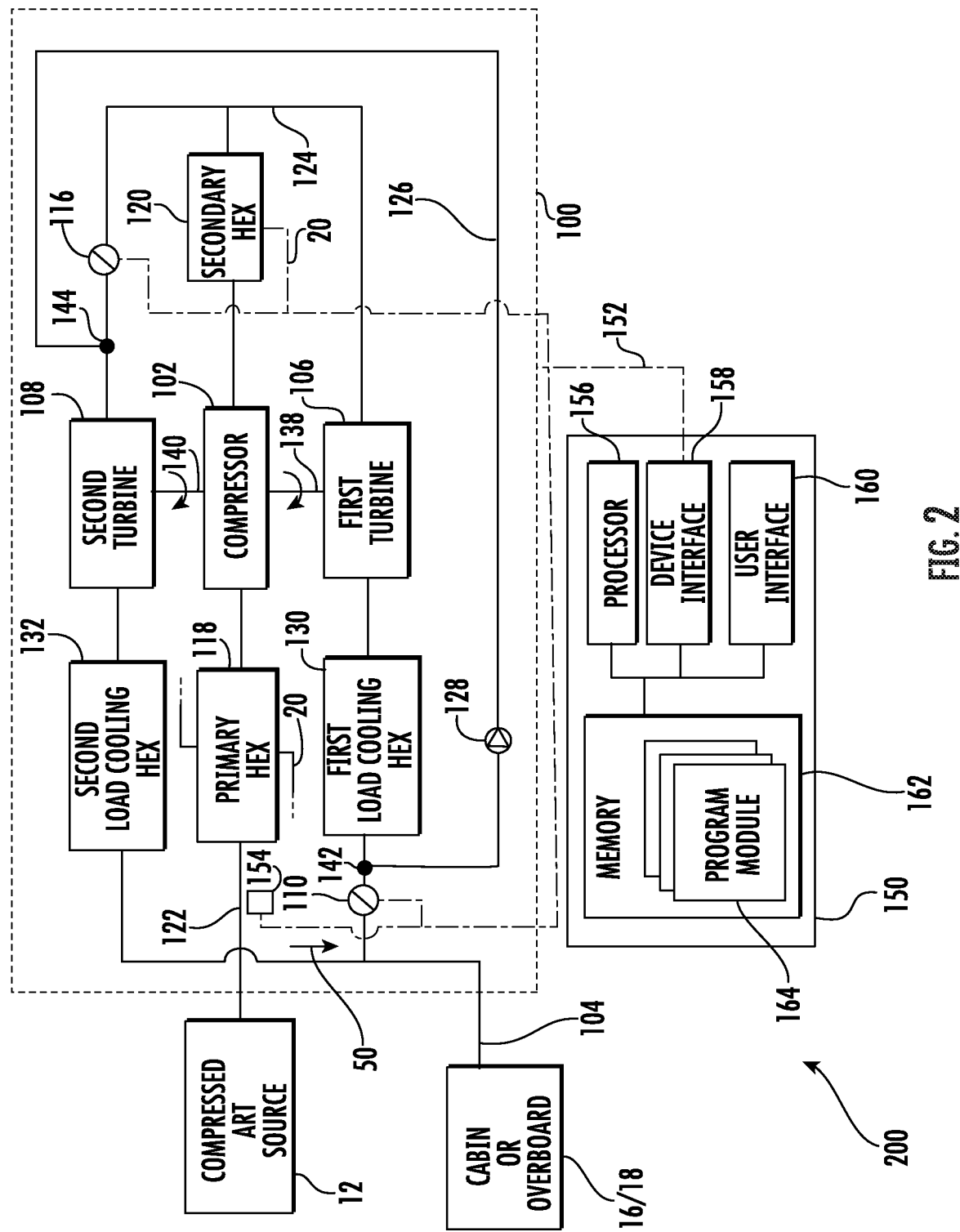
FIG. 2 is a schematic view of the air cycle machine of FIG. 1, showing a compressor in fluid communication with an output conduit through a first turbine and a second turbine, the compressor connected to the output conduit through a first valve and a second valve.

With reference to FIG. 2, the air cycle machine system 200 is shown. The air cycle machine 100 generally includes a compressor 102, an output conduit 104, a first turbine 106, a second turbine 108, and a valve 110. The compressor 102 is in fluid communication with the output conduit 104. The first turbine 106 is operably connected to the compressor 102 and fluidly couples the compressor 102 to the output conduit 104. The second turbine 108 is operably connected to the compressor 102 and fluidly couples the compressor 102 to the output conduit 104. The valve 110 couples the compressor 102 with the output conduit 104 and has a valve open position 112 (shown in FIG. 3) and a valve closed position 114 (shown in FIG. 4). When the valve 110 is in the valve open position 112 the first turbine 106 and the second turbine 108 are fluidly connected in parallel between the compressor 102 and the output conduit 104. When the valve 110 is in the valve closed position 114 the first turbine 106 is fluidly connected in series with the second turbine 108 between the compressor 102 and the output conduit 104.

The valve 110 is a first valve 110 and the air cycle machine 100 also includes a second valve 116, a primary heat exchanger 118, and a secondary heat exchanger 120. The air cycle machine 100 additionally includes a bleed air conduit 122, a manifold 124, and a bypass conduit 126. The air cycle machine 100 further includes a check valve 128, a first load cooling heat exchanger 130, and a second load cooling heat exchanger 132.

The bleed air conduit 122 fluidly couples the compressed air source 12 to the primary heat exchanger 118. The primary heat exchanger 118 is in thermal communication with the fan or ram air duct 20 and fluidly couples the bleed air conduit 122 to the compressor 102. The compressor 102 fluidly couples the primary heat exchanger 118 to the secondary heat exchanger 120. The secondary heat exchanger 120 is in thermal communication with the fan or ram air duct 20 and fluidly couples the compressor 102 to the manifold 124.

The manifold 124 fluidly couples the compressor to the first turbine 106. The first turbine 106 is operably connected to the compressor 102, e.g., through a first turbine compressor drive shaft 134, and fluidly couples the manifold to the first load cooling heat exchanger 130. The first load cooling heat exchanger 130 is in thermal communication with the heat load 14 (shown in FIG. 1) and fluidly couples the first turbine 106 with the first valve 110. The first valve 110 connects the first turbine 106 to the output conduit 104 and has the first valve open position 112 (shown in FIG. 3) and the first valve closed position 114 (shown in FIG. 4). In the first valve open position 112 the first valve 110 fluidly couples the first load cooling heat exchanger 130, which is in thermal communication with the heat load 14 (shown in FIG. 1), with the output conduit 104. In the first valve closed position the 114 the first valve 110 fluidly separates the first load cooling heat exchanger from the output conduit 104.

In the illustrated example the air cycle machine 100 also includes a controller 150, a link 152, and a sensor 154. The controller 150 includes a processor 156 and a device interface 158. The controller 150 also includes a user interface 160 and a memory 162. The link 152 connects the controller 150 with the first valve 110, the controller 150 thereby operably connected to the first valve 110 for moving the first valve 110 between the first valve open position 112 (shown in FIG. 3) and the first valve closed position 114 (shown in FIG. 4). The link 152 connects the controller 150 with the second valve 116, the controller 150 thereby operably connected to the second valve 116 for moving the second valve 116 between the second valve open position 134 (shown in FIG. 3) and the second valve closed position 136 (shown in FIG. 4). It is also contemplated that the link 152 connect the controller 150 with the sensor 154, the controller 150 thereby receiving a signal 34 indicative of one or more of temperature, pressure, and/or mass flow rate of the compressed air flow 24 within the bleed air conduit 122, e.g., a bleed air pressure measurement.

The bypass conduit 126 connects the first load cooling heat exchanger 130 to the second turbine 108. More specifically, the bypass conduit 126 connects a first union 142 to a second union 144. The first union 142 fluidly couples the first load cooling heat exchanger 130 to the first valve 110 and the second union 144 fluidly couples the second valve 116 to the second turbine 108. The check valve 128 is arranged along the bypass conduit 126, fluidly couples the first union 142 to the second union 144 and has a closed position 146 (shown in FIG. 3) and an open position 148 (shown in FIG. 4). In the closed position 146 the check valve 128 fluidly separates the first union 142 from the second union 144 through the bypass conduit 126. In the open position 148 the check valve 128 fluidly couples the first union 142 to the second union 144. It is contemplated that the check valve allows one-way fluid communication through the bypass conduit 126, i.e., from the first union 142 to the second union 144 only.

The manifold 124 also fluidly couples the compressor 102 to the second valve 116. The second valve 116 connects the manifold 124 to the second turbine 108 and has a second valve open position 134 (shown in FIG. 3) and a second valve closed position 136 (shown in FIG. 4). In the second valve open position 134 the second valve 116 fluidly couples the manifold to the second turbine 108. In the closed position the second valve 116 fluidly separates the manifold 124 from the second turbine 108. The second turbine 108 is operably connected to the compressor 102, e.g., via a second turbine compressor drive shaft 140, and fluidly couples the second valve 116 to the second load cooling heat exchanger 132. The second load cooling heat exchanger 132 is in thermal communication with the heat load 14 (shown in FIG. 1) and fluidly couples the second turbine 108 to the output conduit 104. In certain examples the first turbine compressor drive shaft 138 and the second turbine compressor drive shaft 140 are portions of common compressor drive shaft 138/140.

The processor 156 is disposed in communication with the device interface 158, the user interface 160, and the memory 162. Communication with the device interface 158 enables the processor 156 to operate the first valve 110 and the second valve 116, and to receive the signal 34. Communication with the user interface 160 allows the processor 156 to receive user input and/or provide output to a user. Communication with memory 162 allows the processor 156 to read instructions, recorded in a plurality of program modules 164 recorded on the memory 162, that cause the processor 156 to execute certain operations. Among those operations are operations of a method 200 (shown in FIG. 5) of controlling flow through an air cycle machine, e.g., the air cycle machine 100, as will be described. It is contemplated that the memory 162 include a non-transitory machine-readable medium. It is also contemplated that the controller 150 be implemented with circuitry, software, or a combination of circuitry and software.

Figure 3:
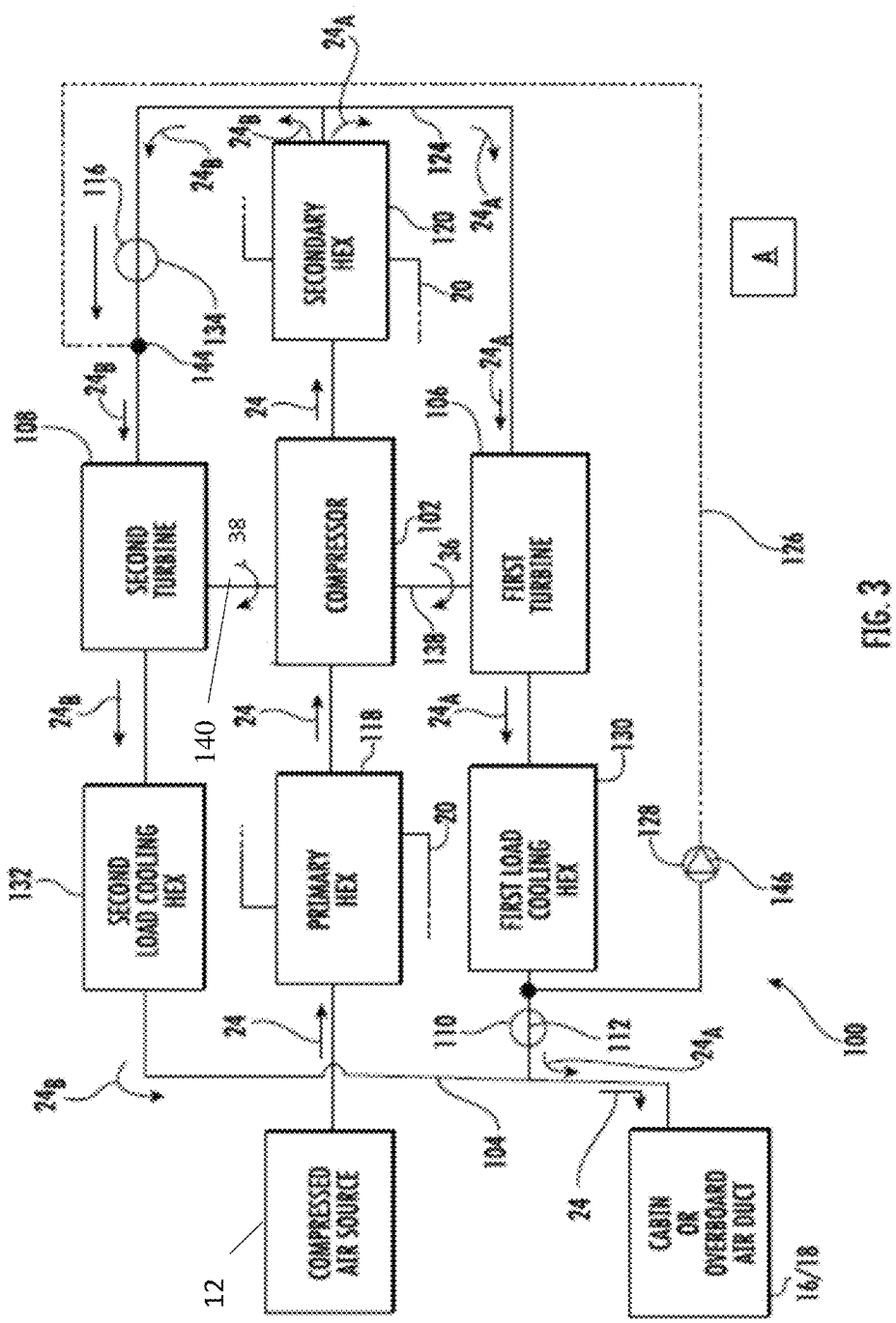
FIG. 3 is a schematic view of the air cycle machine of FIG. 1, showing the air cycle machine operating in the low input pressure mode of operation, the first turbine and the second turbine connected in parallel with one another between the compressor and the output conduit.

With reference to FIG. 3, the air cycle machine 100 is shown in the first mode A. In the first mode A the first turbine 106 and the second turbine 108 are fluidly connected in parallel with one another between the manifold 124 and the output conduit 104 of the air cycle machine 100. Parallel connection is accomplished by (a) moving the first valve 110 to the first valve open position 112, and (b) moving the second valve 116 to in the second valve open position 134. Opening of the first valve 110 causes the first valve 110 to fluidly couple the first load cooling heat exchanger 130 with the output conduit 104. Opening of the second valve 116 causes the second valve 116 to fluidly couple the manifold 124 to the second turbine 108.

In certain examples opening is accomplished coincidently, e.g., by moving both the first valve 110 to the first valve open position 112 and the second valve 116 to the second valve open position 134 at the same time. In accordance with certain example coincident opening is accomplished by moving the first valve 110 to the first valve open position 112 from the first valve closed position 114 (shown in FIG. 4) and by moving the second valve 116 to the second valve open position 134 from the second valve closed position 136 (shown in FIG. 4). This can be done, for example, by issuing an opening signal 40 to an actuator (or actuators) operably connected to the first valve 110 and the second valve 116 from the controller 150 (shown in FIG. 2). The opening signal 42 can be generated, for example, by comparing a measurement of compressed air flow 24 provided by the sensor 154 (shown in FIG. 2) to a predetermined pressure value, e.g., a predetermined bleed air pressure value.

During operation in the second mode B the compressed air flow 24 traverses the primary heat exchanger 118. The primary heat exchanger 118 cools the compressed air flow 24 by transferring heat from the compressed air flow 24 to air from the ambient environment traversing the fan or ram air duct 20 and communicates the compressed air flow 24 to the compressor 102. The compressor 102 in turn further compresses the compressed air flow 24 using rotation 36 received from the first turbine 106 through the first turbine compressor drive shaft 138 and rotation 38 received from the second turbine 108 through the second turbine compressor drive shaft 140, the compressor 102 communicating the further compressed air flow 24 to the secondary heat exchanger 120. The secondary heat exchanger 120 further cools the compressed air flow 24 to the air from traversing the fan or ram air duct 20 and thereafter communicates the cooled compressed air flow 24 to the manifold 124.

The manifold 124, fluidly coupled to both the first turbine 106 and the second turbine 108, divides the compressed air flow 24 into a first compressed air flow portion $24_A$ for communication to the first turbine 106 and a second compressed air flow portion $24_B$ for communication to the second turbine 108. The first turbine 106 extracts work from the first compressed air flow portion $24_A$ and communicatees the extracted work to the compressor 102 via the first turbine compressor drive shaft 138. As the first compressed air flow portion $24_A$ traverses the first turbine 106 the air forming the first compressed air flow portion $24_A$ drops in both pressure and temperature and is thereafter communicated to the first load cooling heat exchanger 130. The first load cooling heat exchanger 130 transfers heat from a heat load, e.g., the heat load 14 (shown in FIG. 1), increasing temperature and pressure of the first compressed air flow portion $24_A$, and thereafter communicates the first compressed air flow portion $24_A$ to the first union 142.

The first union 142, fluidly separated from the bypass conduit 126 bypass conduit 126 by the check valve 128, communicates the first compressed air flow portion $24_A$ to the output conduit 104 of the air cycle machine 100. It is contemplated that the first compressed air flow portion $24_A$ be of pressure insufficient to move the check valve 128 from the check valve closed position 146 (shown in FIG. 4) to the check valve open position 148, the bypass conduit 126 thereby being fluidly separated from the second union 44. The first compressed air flow portion $24_A$ therefore traverses the first turbine 106 and thereafter flows through the first load cooling heat exchanger 130, wherein the first compressed air flow portion $24_A$ receives heat from the heat load 14 (shown in FIG. 1), and thereafter joins the second compressed air flow portion $24_B$ for communication therewith to the cabin or overboard air duct 18 via the output conduit 104 of the air cycle machine 100.

The second compressed air flow portion $24_B$ flows from the manifold 124 to the second valve 116. The second valve 116 communicates the second compressed air flow portion $24_B$ to the second union 144, and the therethrough to the second turbine 108. The second turbine 108 extracts work from the second compressed air flow portion $24_B$ and communicates the extracted work to the compressor 102 via the second turbine compressor drive shaft 140 as the second turbine mechanical rotation 38. The second compressed air flow portion $24_B$ thereafter flows through the second load cooling heat exchanger 132. The second load cooling heat exchanger 132 in turn communicates heat to the second compressed air flow portion $24_B$, heating the second compressed air flow portion $24_B$ as the second compressed air flow portion $24_B$ as traverses the second load cooling heat exchanger 132. The second compressed air flow portion 24$_B$ thereafter joins the first compressed air flow portion 24$_A$ in the output conduit 104 and flows to the cabin or overboard air duct 18.

Figure 4:
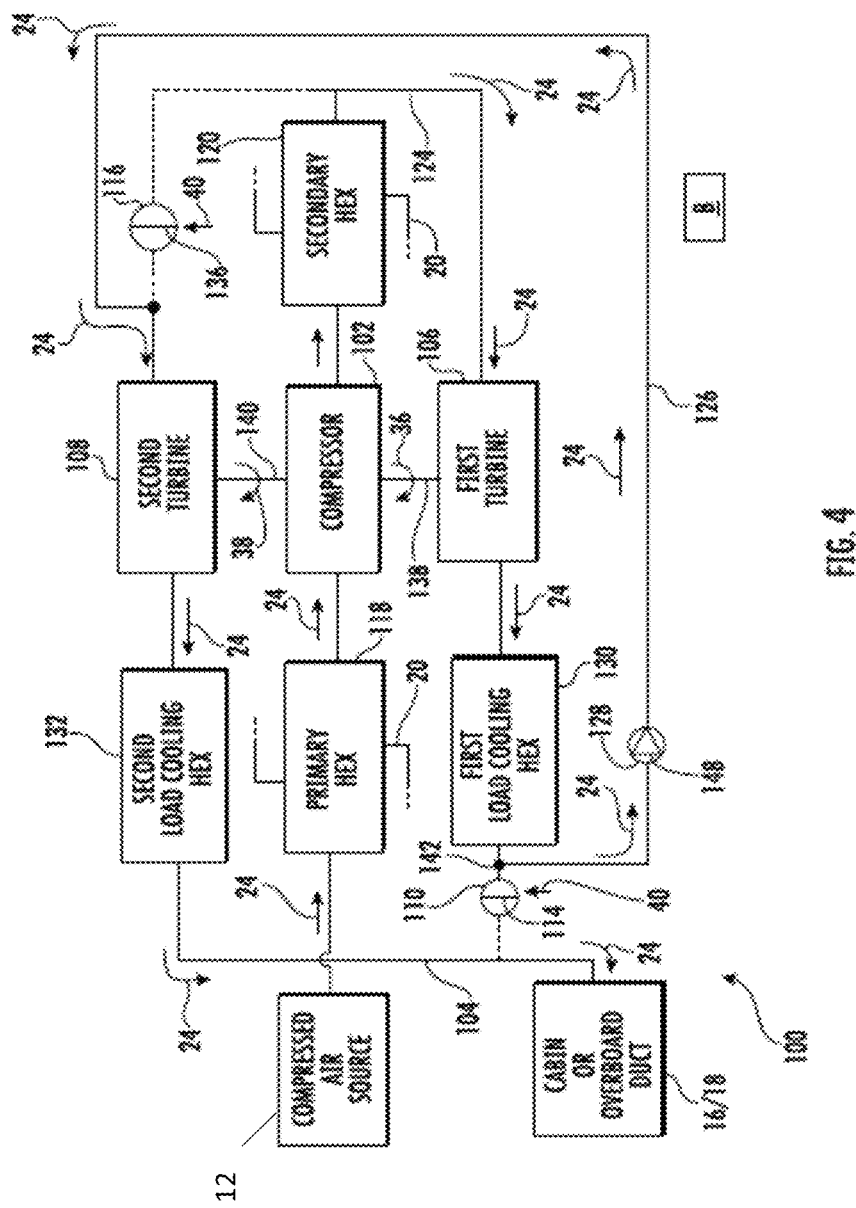
FIG. 4 is a schematic view of the air cycle machine of FIG. 1, showing the air cycle machine operating in the high input pressure mode of operation, the first turbine and the second turbine connected in series with one another between the compressor and the output conduit.

With reference to FIG. 4, the air cycle machine 100 is shown in the second mode B. In the second mode B the second turbine 108 is fluidly coupled in series with the first turbine 106 between the manifold 124 and the output conduit 104 of the air cycle machine 100. The serial connection accomplished by moving the first valve 110 to the first valve closed position 114 and moving the second valve 116 to in the second valve closed position 136. Closure of the first valve 110 causes the first valve 110 to fluidly separate the first load cooling heat exchanger 130 from the output conduit 104. Closure of the second valve 116 causes the second valve 116 to fluidly separate the bypass conduit 126 from the second turbine 108.

In certain examples closure is accomplished coincidently, e.g., by moving both the first valve 110 to the first valve closed position 114 and the second valve 116 to the second valve closed position 136 at the same time. In accordance with certain example coincident closure is accomplished by moving the first valve 110 to the to the first valve closed position 114 from the first valve open position 112 (shown in FIG. 3) and moving the second valve 116 from the second valve closed position 136 from the second valve open position 134 (shown in FIG. 3). This can be done, for example, by issuing a closure signal 40 to an actuator (or actuators) operably connected to the first valve 110 and the second valve 116 from the controller 150 (shown in FIG. 2). The closure signal 40 can be generated, for example, by comparing a measurement of compressed air flow 24 provided by the sensor 154 (shown in FIG. 2) to a predetermined pressure value.

During operation in the second mode B the compressed air flow 24 traverses the primary heat exchanger 118. The primary heat exchanger 118 cools the compressed air flow 24 by transferring heat from the compressed air flow 24 to air from the ambient environment traversing the fan or ram air duct 20 and communicates the compressed air flow 24 to the compressor 102. The compressor 102 in turn further compresses the compressed air flow 24 using rotation 36 received from the first turbine 106 through the first turbine compressor drive shaft 138 and rotation 38 received from the second turbine 108 through the second turbine compressor drive shaft 140 and communicates the compressed air flow 24 to the secondary heat exchanger 120. The secondary heat exchanger 120 further cools the compressed air flow 24 to the air from traversing the fan or ram air duct 20 and thereafter communicates the compressed air flow 24 to the manifold 124.

The manifold 124, fluidly separated from the second turbine 108 by the second valve 116, communicates the entirety of the compressed air flow 24 to the first turbine 106. The first turbine 106 extracts work from the compressed air flow 24 and communicatees the extracted work to the compressor 102 via the first turbine compressor drive shaft 138. As compressed air flow 24 traverses the first turbine 106 the air forming the compressed air flow 24 drops in pressure and temperature and is thereafter communicated to the first load cooling heat exchanger 130. The first load cooling heat exchanger 130 transfers heat from a heat load, e.g., the heat load 14 (shown in FIG. 1), increasing temperature and pressure of the compressed air flow 24, and thereafter communicates the compressed air flow 24 to the first union 142.

The first union 142, fluidly separated from the output conduit 104 by the first valve 110, communicates the compressed air flow 24 to the bypass conduit 126. It is contemplated that the compressed air flow 24 be of pressure sufficient to move the check valve 128 from the check valve closed position 146 (shown in FIG. 4) to the check valve open position 148, the bypass conduit 126 thereby fluidly coupling the first union 142 to the second union 44 and communicating the compressed air flow 24 to the second union 144. The second union 144, fluidly separated from the manifold 124 by the second valve 116, communicates the entirety of compressed air flow to the second turbine 108.

The second turbine 108 extracts work from the compressed air flow 24 and communicatees the extracted work to the compressor 102 via the second turbine compressor drive shaft 140. As compressed air flow 24 traverses the second turbine 108 the compressed air flow 24 drops in both pressure and temperature and is thereafter communicated to the second load cooling heat exchanger 132. The second load cooling heat exchanger 132 transfers heat from a heat load, e.g., the heat load 14 (shown in FIG. 1), increasing temperature and pressure of the compressed air flow 24 and thereafter communicates the compressed air flow 24 to the output conduit 104. Notably, the entirety of the compressed air flow 24 serially traverses the first turbine 106 and the second turbine 108.

Figure 5:
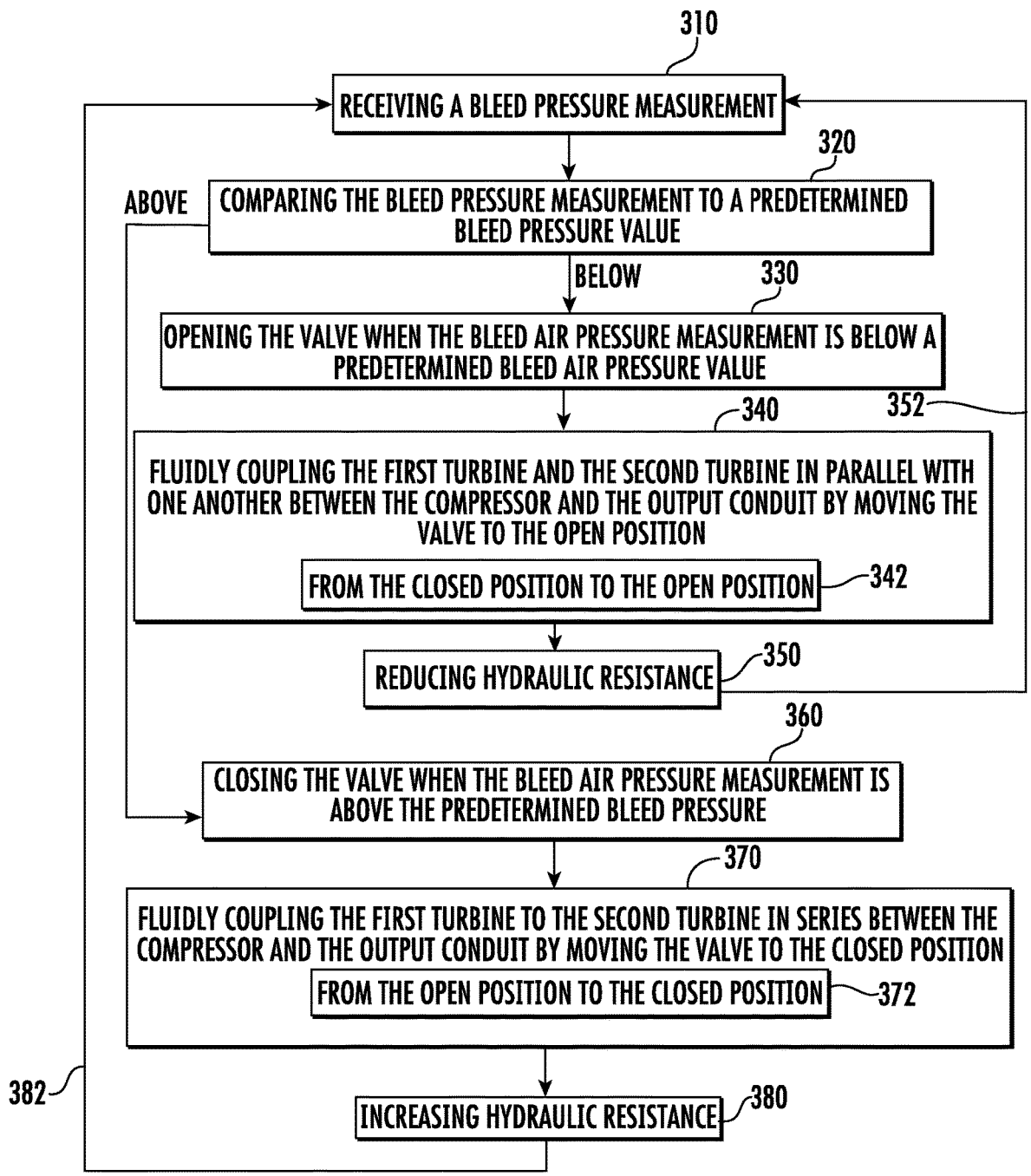
FIG. 5 is a block diagram of a method of controlling air flow through an air cycle machine in accordance with an illustrative and non-limiting example of the method.

With reference to FIG. 5, the method 300 of controlling flow in air cycle machine, e.g., the air cycle machine 100 (shown in FIG. 1), is shown. The method 300 includes receiving a bleed air flow measurement, e.g., the bleed pressure measurement signal 50 (shown in FIG. 2), as shown with box 310. The bleed pressure measurement is compared to a predetermined bleed pressure measurement, e.g., a predetermined bleed pressure measurement record in the program module 162 (shown in FIG. 2), as shown with box 320.

When the bleed flow measurement is below the predetermined pressure measurement a first turbine of the air cycle machine is connected with a second turbine in parallel between a manifold and an output conduit of the air cycle machine, e.g., the first turbine 106 (shown in FIG. 2) is connected in parallel with the second turbine 108 (shown in FIG. 2) between the manifold 126 (shown in FIG. 2) and the bleed air conduit 104 (shown in FIG. 2), as shown with box 342. As shown with box 330, parallel connection is accomplished by opening a first valve and a second valve, e.g., the first valve 110 (shown in FIG. 2) and the second valve 116 (shown in FIG. 2). In certain examples connecting the first turbine in parallel with the second turbine reduced hydraulic resistance of the air cycle machine, as shown with box 350. In accordance with certain examples connecting the first turbine in parallel with the second turbine can include moving the either (or both) the first valve and the second valve from closed positions to the open positions, e.g., without throttling flow through either valve with the first valve and/or the second valve, as shown with box 342. It is contemplated that the first turbine and the second turbine remain connected in parallel with one another while the bleed pressure is below the predetermined pressure, as shown with arrow 352.

When the bleed flow measurement is above the predetermined pressure measurement the first turbine of the air cycle machine is connected in series with the second turbine between the manifold and the output conduit of the air cycle machine, as shown with box 370. As shown with box 360, serial connection is accomplished by closing the first valve and the second valve. In certain examples connecting the first turbine in series with the second turbine increases hydraulic resistance of the air cycle machine, as shown with box 380. In accordance with certain examples, connecting the first turbine in series with the second turbine can include moving the either (or both) the first valve and the second valve from open positions to closed positions, e.g., without throttling flow through either valve with the first valve and/or the second valve, as shown with box 372. It is contemplated that the first turbine and the second turbine remain connected to one another in series while the bleed pressure is above the predetermined pressure, as shown with arrow 382.

Air cycle machines can be required to operate over large envelopes and a wide range of conditions. While air cycle machines are generally sized to operate at or near peak performance at a particular design/sizing condition, the drop off on performance as conditions deviate from the design condition must be managed.

In examples described herein air cycle machines configured for bootstrap cycle operation include a manifold connecting a secondary heat exchanger to a first turbine and a second turbine. The first turbine and the second turbine are in turn operably connected to a compressor, which is fluidly coupled to the manifold by the secondary heat exchanger. It is contemplated that the air cycle machine have a first mode, wherein the first valve and the second valve are open and connect the second turbine fluidly in parallel with the first turbine between the manifold the output conduit of the air cycle machine, and a second mode, wherein the first valve and the second valve are closed such that the second turbine is connected fluidly in series with the first turbine between the manifold and the output conduit of the air cycle machine.

Advantageously, the first mode and the second mode provide air cycle machines described herein the flexibility to switch between parallel turbine operation and serial turbine operation, increasing and/or improving performance of the air cycle machine at the extremes of the air cycle machine operating envelope and/or expanding the range of operating conditions within which the air cycle machine can operation. For example, when engine bleed pressure is high, air cycle machines described herein can arrange the first turbine and the second turbine in series with one another—providing better performance than when high engine bleed pressure is provided to turbines arranged in parallel with one another. Oppositely, when engine bleed pressure is low, air cycle machines described herein can arrange the second turbine in parallel with the first turbine, reducing hydraulic resistance with respect serial arrangement and providing better performance than serially arranged turbines under low bleed pressure conditions.

In certain examples a common drive shaft operably connects both the first turbine and the second turbine to the compressor, providing the above described operational flexibility within a single air cycle machine. In accordance with certain examples a first load cooling heat exchanger is arranged fluidly downstream of the first turbine and a second load cooling heat exchanger is arranged fluidly downstream of the second turbine to absorb heat from a heat load and flow air from the air cycle machine to either the aircraft cabin or an overboard duct.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An air cycle machine, comprising:
   a compressor in fluid communication with an output conduit;
   a heat exchanger coupled to an output of the compressor;
   a first turbine that includes a first compressor drive shaft connected to the compressor, wherein the first turbine drives the compressor via the first compressor drive shaft;
   a first valve that has an open position and a closed position;
   a first load cooling heat exchanger fluidly coupled to an output of the first turbine and between the first turbine and first valve; and
   a second turbine that includes a second compressor drive shaft connected to the compressor, wherein the second turbine drives the compressor via the second compressor drive shaft;
   wherein both the first turbine and the second turbine are coupled to an output of the compressor with the output conduit;
   a second valve connected between the heat exchanger and the second turbine, wherein the second valve has an open position and a closed position;
   wherein the first valve couples the first load cooling heat exchanger to the output conduit, wherein inputs to the first turbine and the second turbine are fluidly connected in parallel between the compressor and the output conduit in a first mode when the first valve is in the open position, wherein the first turbine is fluidly connected in series with the second turbine and between the compressor and the output conduit in a second mode when the first valve is in the closed position, wherein in the second mode fluid leaving the first turbine passes through the first load cooling heat exchanger before it reaches the second turbine;
   wherein in the first mode an output of the heat exchanger is directly connected to the input of the first turbine and to the input of the second turbine to thereby allow the first turbine and the second turbine to operate in parallel; and
   wherein in the second mode:
      the output of the heat exchanger is only directly connected to the input of the first turbine; and the second valve blocks flow from passing directly to the second turbine-from the output of the heat exchanger.

2. The air cycle machine of claim 1, further comprising a check valve coupling the first turbine to the second turbine.

3. The air cycle machine of claim 1, further comprising a compressed air source in fluid communication with the first turbine through the compressor.

4. The air cycle machine of claim 1, further comprising a cabin or an overboard duct in fluid communication with the output conduit.

5. The air cycle machine of claim 1, further comprising:
a second load cooling heat exchanger fluidly coupling the second turbine to the output conduit.

6. The air cycle machine of claim 1, further comprising a primary heat exchanger fluidly coupled to the compressor.

7. The air cycle machine of claim 1, further comprising a controller operably connected to the first valve and having a memory with instructions recorded thereon that cause the controller to:
receive a bleed air pressure measurement;
open the first valve when the bleed air pressure measurement is below a predetermined bleed air pressure value; and
close the first valve when the bleed air pressure measurement is above the predetermined bleed air pressure value.

8. A system comprising:
an air cycle machine as recited in claim 1;
a compressed air source in fluid communication with the first turbine through the compressor; and
a cabin or overboard duct in fluid communication with the output conduit.

9. The system of claim 8, further comprising:
a controller operably connected to the first valve and the second valve, the controller including a memory having instructions recorded thereon that cause the controller to:
receive a bleed air pressure measurement;
open the first valve when the bleed air pressure measurement is below a predetermined bleed air pressure value by moving the first valve to the open position;
open the second valve when the bleed air pressure measurement is below the predetermined bleed air pressure value by moving the second valve to the open position;
close the first valve when the bleed air pressure measurement is above the predetermined bleed air pressure value by moving the first valve to the closed position; and
close the second valve when the bleed air pressure measurement is above the predetermined bleed air pressure value by moving the second valve to the closed position.

10. The system of claim 9, wherein the instructions cause the controller to move the first and second valve to the closed position coincidently with one another.

11. The system of claim 9, wherein the instructions cause the controller to move the first and second valves to the open position coincidently with one another.

\* \* \* \* \*